(12) United States Patent
Haga et al.

(10) Patent No.: US 6,384,348 B1
(45) Date of Patent: May 7, 2002

(54) PACKING ERROR DETECTING SYSTEM

(75) Inventors: Ichiro Haga, Yokohama; Tetsuya Kojima, Kawasaki; Morimasa Miyoshi, Ayase, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,064

(22) Filed: Mar. 31, 2000

(30) Foreign Application Priority Data

Apr. 6, 1999 (JP) .......................................... 11-098899

(51) Int. Cl.$^7$ ............................. G07G 1/00; G01G 19/40

(52) U.S. Cl. ............................... 177/25.15; 177/25.19; 186/41; 186/53; 705/15; 705/16; 705/22; 705/23; 705/414; 235/383

(58) Field of Search .......................... 177/25.11, 25.12, 177/25.13, 25.14, 25.15, 25.19, 50; 705/16, 15, 22, 23, 414, 416; 186/41, 53; 235/383

(56) References Cited

U.S. PATENT DOCUMENTS

| | | | | | |
|---|---|---|---|---|---|
| 4,779,706 | A | * | 10/1988 | Mergenthaler | ............... 235/383 |
| 4,787,467 | A | * | 11/1988 | Johnson | ....................... 177/50 |
| 4,792,018 | A | * | 12/1988 | Humble et al. | ................ 177/50 |
| 5,494,136 | A | * | 2/1996 | Humble | ...................... 235/383 |
| 5,497,314 | A | * | 3/1996 | Novak | ......................... 235/383 |
| 5,608,193 | A | * | 3/1997 | Almogaibil | ............... 177/25.13 |
| 5,609,223 | A | * | 3/1997 | Iizaka et al. | ................ 235/383 |
| 5,907,275 | A | * | 5/1999 | Battistini et al. | ............. 705/15 |
| 6,003,015 | A | * | 12/1999 | Kang et al. | .................... 705/15 |

\* cited by examiner

*Primary Examiner*—Randy W. Gibson
(74) *Attorney, Agent, or Firm*—Connolly Bove Lodge & Hutz LLP

(57) ABSTRACT

The information of sales items is transmitted from a cash register 1 to a sensing device 2 and stored in a sales items memory 26. In the sensing device 2, a commodities information memory 25 stores the information relating to a nominal weight of each commodity as well as a nominal weight of a package. A weight sensor 24 measures an actual overall weight of all of the sales items including the package. A controller 23 compares the measured overall weight with a sum of their nominal weight values, to detect any error in the packing operation.

5 Claims, 13 Drawing Sheets

SALES ITEMS TABLE

| ORDER NO. | SALES ITEM NAME | QUANTITY |
|---|---|---|
| 0001 | HAMBURGER | 2 |
| | CHEESE BURGER | 1 |
| | FRIED POTATO | 2 |
| 0002 | FISH BURGER | 1 |
| | FRIED POTATO | 1 |
| | HAMBURGER | 1 |

COMMODITIES INFORMATION TABLE

| COMMODITY NAME | WEIGHT |
|---|---|
| HAMBURGER | 100g |
| CHEESE BURGER | 110g |
| FISH BURGER | 120g |
| FRIED POTATO | 60g |
| BAG | 15g |
| ⋮ | ⋮ |

FIG. 3A    CASH REGISTER CONTROL FLOW
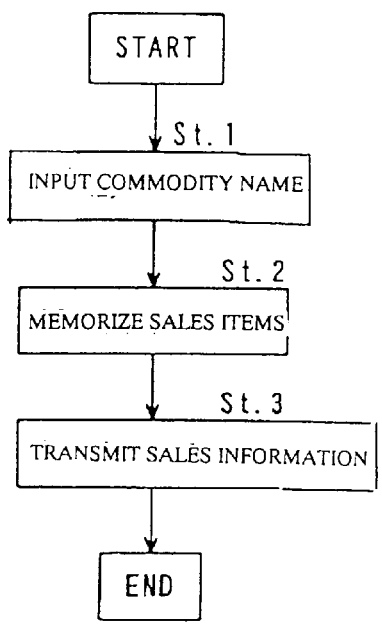
FIG. 3B    SENSING DEVICE CONTROL FLOW
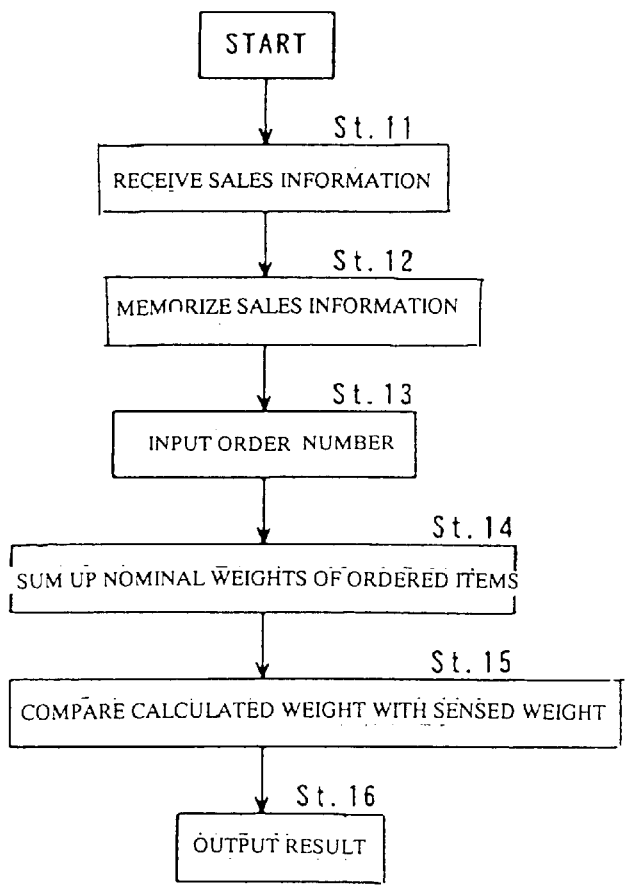

FIG. 6

COMMODITIES INFORMATION TABLE

| COMMODITY NAME | ID No |
|---|---|
| HAMBURGER | 0001 |
| CHEESE BURGER | 0002 |
| FISH BURGER | 0003 |
| FRIED POTATO | 0004 |
| ⋮ | ⋮ |

CASH REGISTER CONTROL FLOW

SENSING DEVICE CONTROL FLOW

FIG. 10

COMMODITIES INFORMATION TABLE

| COMMODITY NAME | WRAPPING COLOR |
|---|---|
| HAMBURGER | BLUE |
| CHEESE BURGER | YELLOW |
| FISH BURGER | RED |
| FRIED POTATO | ORANGE |
| ⋮ | ⋮ |

CASH REGISTER CONTROL FLOW

SENSING DEVICE CONTROL FLOW

COMMODITIES INFORMATION TABLE

| COMMODITY NAME | ID No | WEIGHT |
|---|---|---|
| HAMBURGER | 0001 | 100g |
| CHEESE BURGER | 0002 | 110g |
| FISH BURGER | 0003 | 120g |
| FRIED POTATO | 0004 | 60g |
| ⋮ | ⋮ | |

CASH REGISTER CONTROL FLOW

SENSING DEVICE CONTROL FLOW

COMMODITIES INFORMATION TABLE

| COMMODITY NAME | WRAPPING COLOR | WEIGHT |
|---|---|---|
| HAMBURGER | BLUE | 100g |
| CHEESE BURGER | YELLOW | 110g |
| FISH BURGER | RED | 120g |
| FRIED POTATO | ORANGE | 60g |
| ⋮ | ⋮ | ⋮ |

FIG. 17A  CASH REGISTER CONTROL FLOW
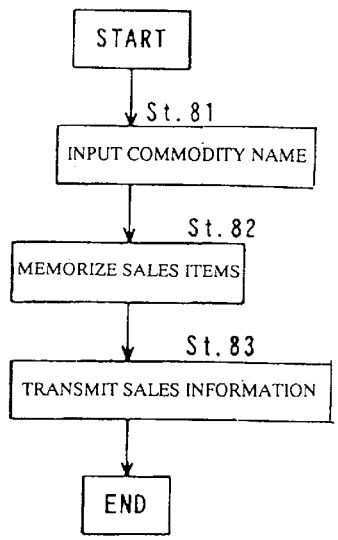
FIG. 17B  SENSING DEVICE CONTROL FLOW
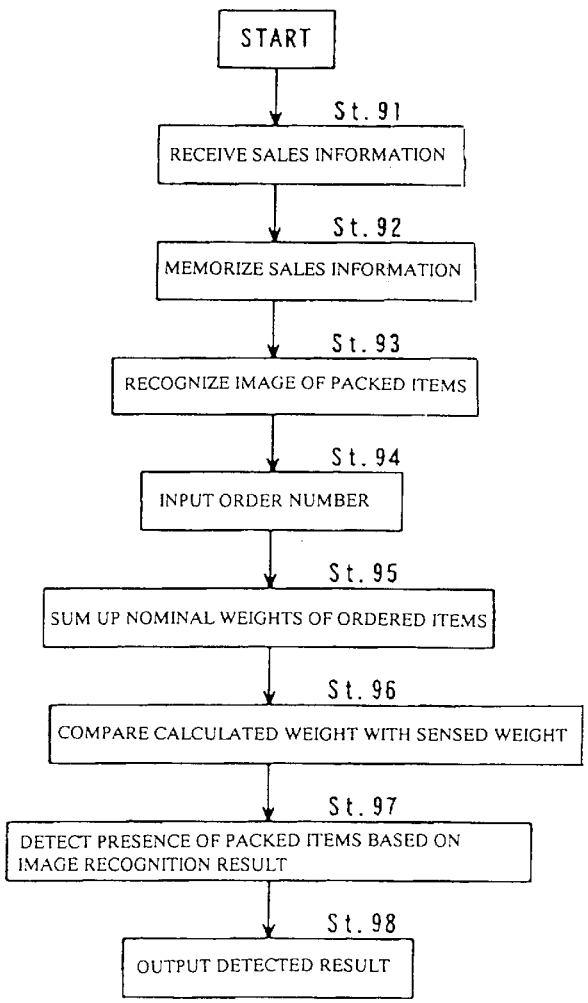

PACKING ERROR DETECTING SYSTEM

BACKGROUND OF THE INVENTION

The present invention relates to a packing error detecting system preferably employed in a fast-food shop system to check whether all of sales items are correctly packed in a package (i.e., bag or the like) in accordance with customer's order without opening the already sealed package, thereby surely eliminating any error in a packing operation.

FIG. 18 shows a typical drive-through shop (i.e., one of the fast-food shops), which allows each customer to place an order and pick the ordered items up while the customer's vehicle moves by the shop window without requiring the customer to get off his/her vehicle.

For example, a customer in his/her vehicle 54 at an order-taking window 51 places an order and pays for ordered items. Then, the customer drives his/her vehicle 54 along an arrow and waits for a while at a pickup window 52 until the ordered items are served. An order slip of the ordered items is sent from the order-taking window 51 to a cookery 53. In the cookery 53, the designated commodities are cooked according to the contents of the received order slip and then packed in a bag. The sealed bag containing the cooked items is sent to the pickup window 52 together with the order slip. Thus, the customer staying in his/her vehicle 54 can receive the ordered items at the pickup window without getting off the vehicle.

SUMMARY OF THE INVENTION

An object of the present invention is to provide a packing error detecting system applicable to this kind of fast-food shop (including the drive-through shop) system. An object of the present invention is to provide a packing error detecting system which is capable of checking whether all of sales items are correctly packed in a package in accordance with the customer's order without opening the already sealed package.

In order to accomplish this and other related objects, the present invention provides a first packing error detecting system, according to which a sales items memory means is provided for storing each commodity name of sales items in response to input information entered in a cash register. A commodity information memory means is provided for storing a nominal weight of each commodity as well as a nominal weight of a package. A sensing means is provided for measuring an actual overall weight of all of the sales items including the package in a condition where the sales items are packed in the package. And, a control means is provided for calculating a nominal weight sum of the sales items and the package based on the information stored in the sales items memory means and the information stored in the commodity information memory means. The control means detects any error in a packing operation of the sales items packed into the package based on a comparison between the nominal weight sum and the actual overall weight measured by the sensing means.

Furthermore, the present invention provides a second packing error detecting system, according to which a sales items memory means is provided for storing each commodity name of sales items in response to input information entered in a cash register. A commodity information memory means is provided for storing ID information of each commodity. A sensing means is provided for detecting ID information transmitted from an IC tag attached on a wrapping cover of each sales item in a condition where the sales items are packed in a package. And, a control means is provided for detecting any error in a packing operation of the sales items packed into the package based on a comparison between the ID information obtained by the sensing means and the information stored in the sales items memory with reference to the information stored in the commodity information memory means.

Furthermore, the present invention provides a third packing error detecting system, according to which a sales items memory means is provided for storing each commodity name of sales items in response to input information entered in a cash register. A commodity information memory means is provided for storing appearance characteristics of a wrapping cover of each commodity. An image recognizing means is provided for detecting the appearance characteristics of the wrapping cover of each sales item in a condition where the sales items are packed in a package. And, a control means is provided for detecting any error in a packing operation of the sales items packed into the package based on a comparison between the recognized result obtained by the image recognizing means and the information stored in the sales items memory with reference to the information stored in the commodity information memory means.

Furthermore, the present invention provides a fourth packing error detecting system, according to which a sales items memory means is provided for storing each commodity name of sales items in response to input information entered in a cash register. A commodity information memory means is provided for storing a nominal weight of each commodity as well as a nominal weight of a package in addition to ID information of each commodity. A first sensing means is provided for measuring an actual overall weight of all of the sales items including the package in a condition where the sales items are packed in the package. A second sensing means is provided for detecting ID information transmitted from an IC tag attached on a wrapping cover of each sales item in a condition where the sales items are packed in the package. And, a control means is provided for calculating a nominal weight sum of the sales items and the package based on the information stored in the sales items memory means and the information stored in the commodity information memory means. The control means detects any error in a packing operation of the sales items packed into the package based on a comparison between the nominal weight sum and the actual overall weight measured by the first sensing means as well as based on a comparison between the ID information obtained by the second sensing means and the information stored in the sales items memory with reference to the information stored in the commodity information memory means.

Moreover, the present invention provides a fifth packing error detecting system, according to which a sales items memory means is provided for storing each commodity name of sales items in response to input information entered in a cash register. A commodity information memory means is provided for storing a nominal weight of each commodity as well as a nominal weight of a package in addition to appearance characteristics of a wrapping cover of each commodity. A sensing means is provided for measuring an actual overall weight of all of the sales items including the package in a condition where the sales items are packed in the package. An image recognizing means is provided for detecting the appearance characteristics of the wrapping cover of each sales item in a condition where the sales items are packed in the package. And, a control means is provided for calculating a nominal weight sum of the sales items and the package based on the information stored in the sales items memory means and the information stored in the commodity information memory means. The control means detects any error in a packing operation of the sales items packed into the package based on a comparison between the nominal weight sum and the actual overall weight measured by the sensing means as well as based on a comparison between the recognized result obtained by the image recognizing means and the information stored in the sales items memory with reference to the information stored in the commodity information memory means.

BRIEF DESCRIPTION OF THE DRAWINGS

The above and other objects, features and advantages of the present invention will become more apparent from the following detailed description which is to be read in conjunction with the accompanying drawings, in which:

FIG. 3A is a flowchart showing an operation performed in a cash register in accordance with the first embodiment of the present invention;

FIG. 3B is a flowchart showing an operation performed in a sensing device in accordance with the first embodiment of the present invention;

FIG. 6 is a view showing a commodities information table used in the packing error detecting system in accordance with the second embodiment of the present invention;

FIG. 10 is a view showing a commodities information table used in the packing error detecting system in accordance with the third embodiment of the present invention;

FIG. 17A is a flowchart showing an operation performed in a cash register controller in accordance with the fifth embodiment of the present invention;

FIG. 17B is a flowchart showing an operation performed in a sensing device controller in accordance with the fifth embodiment of the present invention.

DESCRIPTION OF THE PREFERRED EMBODIMENTS

Figures 1, 2A, 2B:
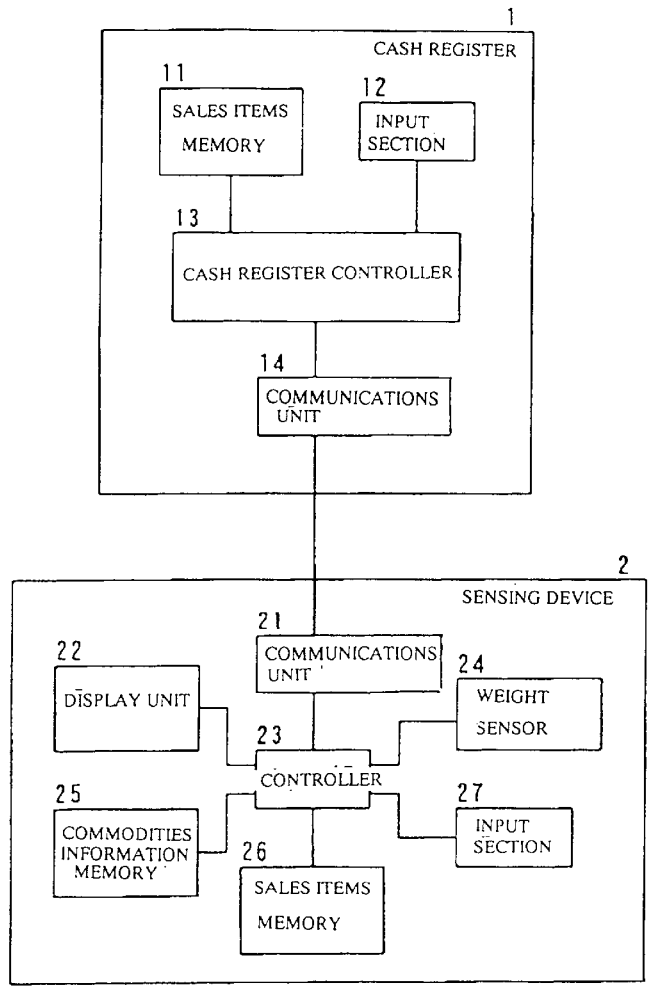
FIG. 1 is a block diagram showing the arrangement of a packing error detecting system in accordance with a first embodiment of the present invention.
FIG. 2A is a view showing a sales items table used in the packing error detecting system in accordance with the first embodiment of the present invention.
FIG. 2B is a view showing a commodities information table used in the packing error detecting system in accordance with the first embodiment of the present invention.

Hereinafter, preferred embodiments of the present invention will be explained with reference to the attached drawings. Identical parts are denoted by the same reference numerals throughout the views.

First Embodiment

Figure 18:
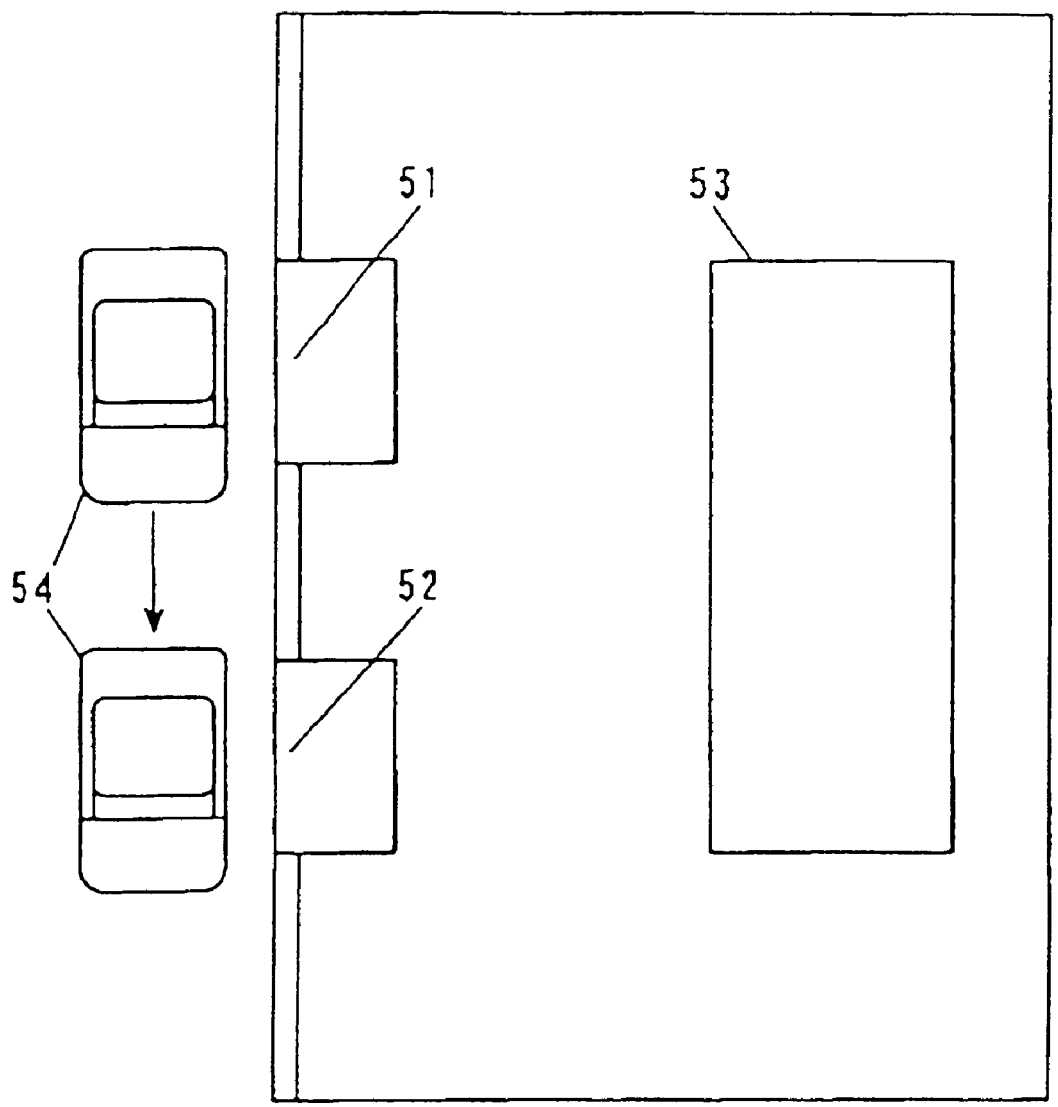
FIG. 18 is a view showing a conventional drive-through shop system.

FIG. 1 is a block diagram showing the arrangement of a packing error detecting system in accordance with a first embodiment of the present invention. The packing error detecting system of the first embodiment chiefly consists of a cash register 1 and a sensing device 2 which are connected to each other by cable or by wireless to perform data communications (e.g., LAN). When this packing error detecting system is employed in a drive-through shop system disclosed in FIG. 18, the cash register 1 is placed by the order-taking window and the sensing device 2 is placed by the pickup window.

The cash register 1 comprises an input section 12 which allows a shop clerk (for the purpose of the order taking procedure) to enter sales items ordered by each customer, a sales items memory 11 which stores each commodity name of the ordered items, a communications unit 14 which transmits the information of the sales items to the sensing device 2, and a cash register controller 13 which controls various sections in the cash resister 1.

The sensing device 2 comprises a communications unit 21 which receives the information transmitted from the cash register 1, a sales items memory 26 which stores the information of the sales items transmitted from the cash register 1, a commodities information memory 25 which stores the information relating to a nominal weight of each commodity as well as a nominal weight of a package, an input section 27 which allows a shop clerk (for the purpose of checking the packed items) to enter an order number etc., a weight sensor 24 which measures an actual overall weight of all of the sales items including the package in the condition where the sales items are packed in the package, a sensing device controller 23 which detects any error in a packing operation, and a display unit 22 which displays the discrimination result sent from the controller 23 to let the shop clerk know the presence of any packing error.

The commodities information memory 25 stores a commodities information table shown in FIG. 2B which describes nominal weight values of registered commodities (e.g., hamburger, cheese burger, fish burger, and fried potato) as well as a nominal weight value of a package (i.e., bag). In the cookery, each ordered item is cooked according to a prepared manual so that the actual weight agrees with its nominal weight.

Hereinafter, an operation of the packing error detecting system in accordance with the first embodiment will be explained.

FIG. 3A is a flowchart showing an operation of the cash register 1 performed in accordance with the first embodiment.

In step 1, the shop clerk (operating the cash register 1) enters sales information through the input section 12 in response to customer's order. The sales information includes an order number, commodity name, and total quantity of each ordered item.

In step 2, the sales information is sent from the controller 13 to the sales items memory 11 in the cash register 1. The sales items memory 11 stores the received sales items by using a sales items table shown in FIG. 2A.

In step 3, the controller 13 of the cash register 1 sends the sales information to the sensing device 2 via the communications unit 14.

Meanwhile, the shop clerk (operating the cash register 1) accomplishes the ordinary cashier procedure and gives the customer a receipt. An order slip issued through this order-taking procedure is sent to the cookery.

FIG. 3B is a flowchart showing an operation of the sensing device 2 performed in accordance with the first embodiment.

In step 11, the communications unit 21 receives the sales information sent from the cash register 1.

In step 12, the sales items memory 26 stores the received sales information by using the same sales items table as that shown in FIG. 2A.

Figure 4:
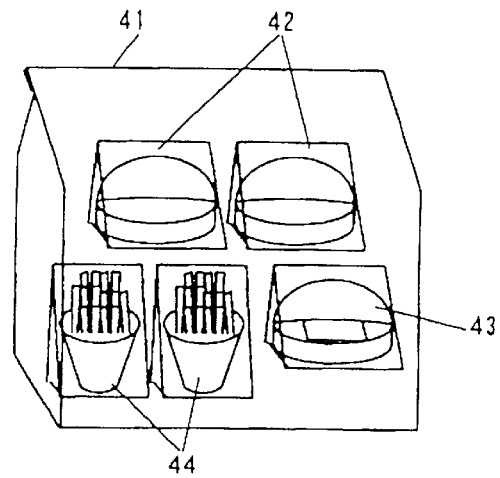
FIG. 4 shows an example of packaged items.

When the cooking of the ordered items is finished, the shop clerk (operating the sensing device 2) receives the sales items packed in a sealed bag 41 together with the order slip. FIG. 4 is a see-through view showing two hamburgers 42, one cheese burger 43, and two fried potatoes 44 packed in the sealed bag 41. However, an actual material of the bag 41 is not transparent. Therefore, the inside of the bag 41 cannot be seen in this case. The received bag is placed on the weight sensor 24 to measure the actual overall weight of all of the cooked items (i.e., sales items) including the package.

In step 13, by operating the input section 27, the shop clerk enters the order number into the controller 23 of the sensing device 2. The order number is printed on the received order slip.

In step 14, the controller 23 reads the data corresponding to the order number (i.e., commodity names and their required quantities) from the sales items table (FIG. 2A) stored in the sales items memory 26. Meanwhile, the controller 23 reads the nominal weight data of the designated commodities and the package (i.e., bag 41) from the commodities information table (FIG. 2B) stored in the commodities information memory 25. Then, the controller 23 calculates a nominal weight sum of all of the sales items and the package based on the readout data (i.e., the nominal weight values of the sales items and the required quantities in addition to the nominal weight of the package).

In step 15, the controller 23 compares the nominal weight sum obtained in the step 14 with the actual overall weight measured by the weight sensor 24. When the difference between the nominal weight sum and the actual overall weight is within a predetermined threshold, the controller 23 judges that the packed items inside the bag 41 are identical with the ordered items. When the difference exceeds the predetermined threshold, the controller 23 judges that the packed items inside the bag 41 are not identical with the ordered items.

In step 16, the controller 23 sends the recognized result to the display unit 22. The display unit 22 displays an error message together with alarm sound or light to inform the shop clerk of occurrence of packing error. The display unit 22 also displays a non-error message when no packing error is detected.

In this manner, the first embodiment of the present invention makes it possible to check whether the packed items inside a non-transparent package agree with the customer's order without opening the already sealed package, thereby accurately detecting any error in the packing operation of the sales items.

When the display unit 22 displays any error message, the shop clerk opens the package to confirm the packing error in detail. Each missing item is sent from the cookery. The shop clerk re-packs the ordered items into the package. Thus, it becomes possible for the shop clerk to easily and promptly prepare a correct package of the sales items.

Second Embodiment

Figure 5:
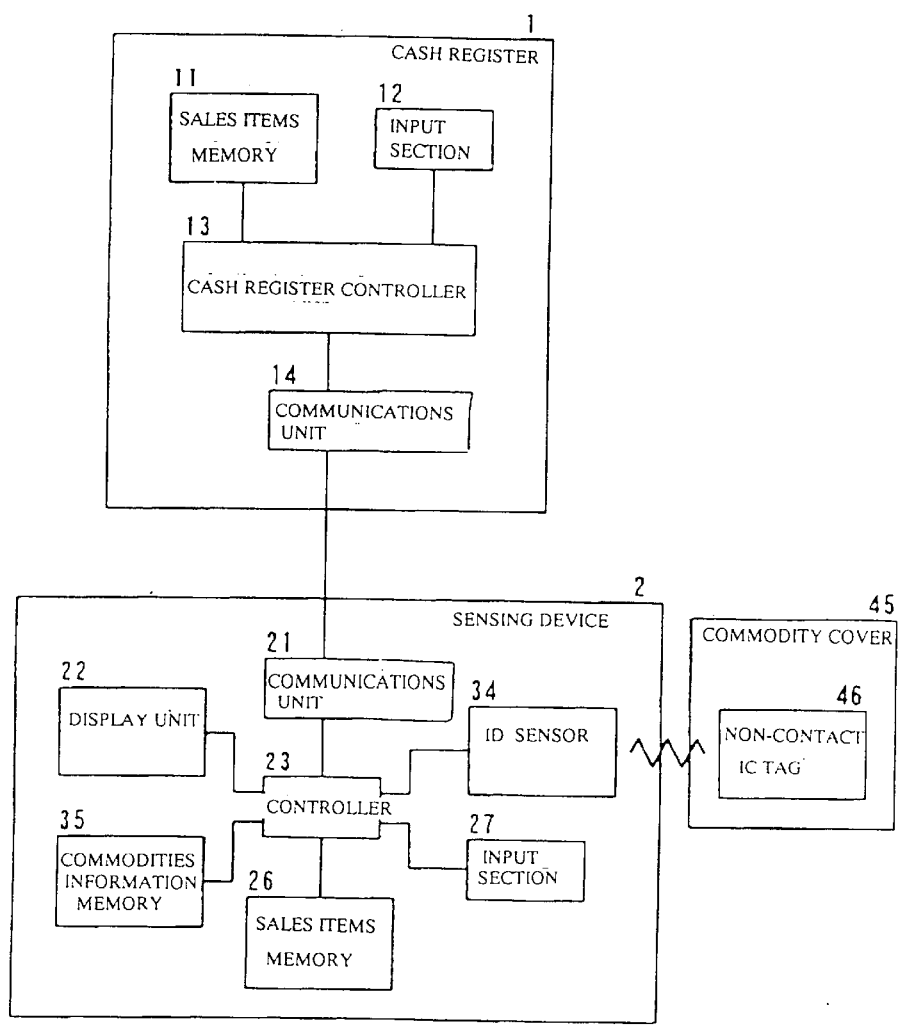
FIG. 5 is a block diagram showing the arrangement of a packing error detecting system in accordance with a second embodiment of the present invention.

FIG. 5 is a block diagram showing the arrangement of a packing error detecting system in accordance with a second embodiment of the present invention. The packing error detecting system of the second embodiment chiefly consists of a cash register 1 and a sensing device 2 which are connected to each other by cable or by wireless to perform data communications. The packing error detecting system in accordance with the second embodiment is characterized in that the packing error is detected by utilizing an IC tag attached on each packed item.

The cash register 1 comprises an input section 12, a sales items memory 11, a communications unit 14, and a cash register controller 13 which are identical with those explained in the first embodiment.

The sensing device 2 comprises a communications unit 21 which receives the information transmitted from the cash register 1, a sales items memory 26 which stores the information of the sales items transmitted from the cash register 1, a commodities information memory 35 which stores the information relating to an ID number of each commodity, an input section 27 which allows the shop clerk to enter an order number etc., an ID sensor 34 which detects ID information transmitted from a non-contact IC tag 46 attached on a commodity cover 45 wrapping each sales item, a sensing device controller 23 which detects any error in a packing operation, and a display unit 22 which displays the discrimination result sent from the controller 23 to let the shop clerk know the presence of any packing error.

Figure 8:
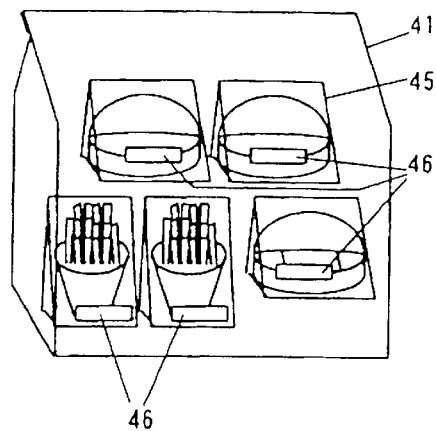
FIG. 8 shows an example of packaged items in accordance with the second embodiment of the present invention.

FIG. 8 is a see-through view showing sales items packed in a sealed bag 41, wherein each sales item is wrapped by a dedicated commodity cover 45 with IC tag 46 thereon. The commodity cover 45 with IC tag 46 is prepared for each commodity. In the cookery, each ordered item is wrapped by using a corresponding commodity cover 45 with IC tag 46, and packed in the bag 41.

The adjustment of IC tag 46 is performed beforehand so as to transmit the ID information (e.g., ID number) of the commodity corresponding to the item to be wrapped by the commodity cover 45.

The commodities information memory 35 stores a commodities information table shown in FIG. 6 Which describes ID numbers of registered commodities (e.g., hamburger, cheese burger, fish burger, and fried potato).

Hereinafter, an operation of the packing error detecting system in accordance with the second embodiment will be explained.

Figure 7A:
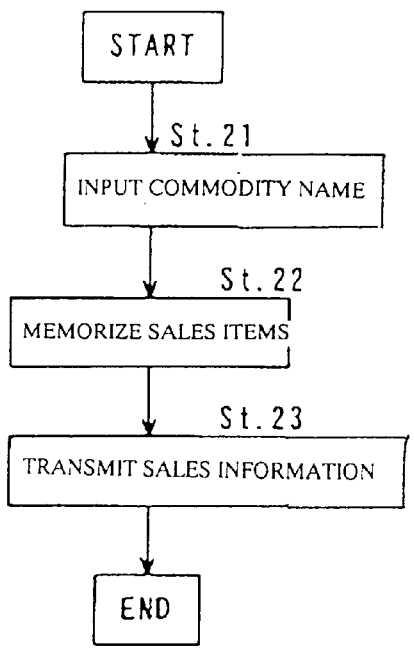
FIG. 7A is a flowchart showing an operation performed in a cash register in accordance with the second embodiment of the present invention.

FIG. 7A is a flowchart showing an operation of the cash register 1 performed in accordance with the second embodiment.

Steps 21 to 23 are identical with the steps 1 to 3 of the first embodiment. In step 21, the shop clerk (operating the cash register 1) enters sales information through the input section 12 in response to customer's order. In step 22, the sales information is sent from the controller 13 to the sales items memory 11. In step 23, the sales information is sent from the cash register 1 to the sensing device 2 via the communications unit 14.

Meanwhile, the shop clerk (operating the cash register 1) accomplishes the ordinary cashier procedure and gives the customer a receipt. An order slip issued through this order-taking procedure is sent to the cookery.

Figure 7B:
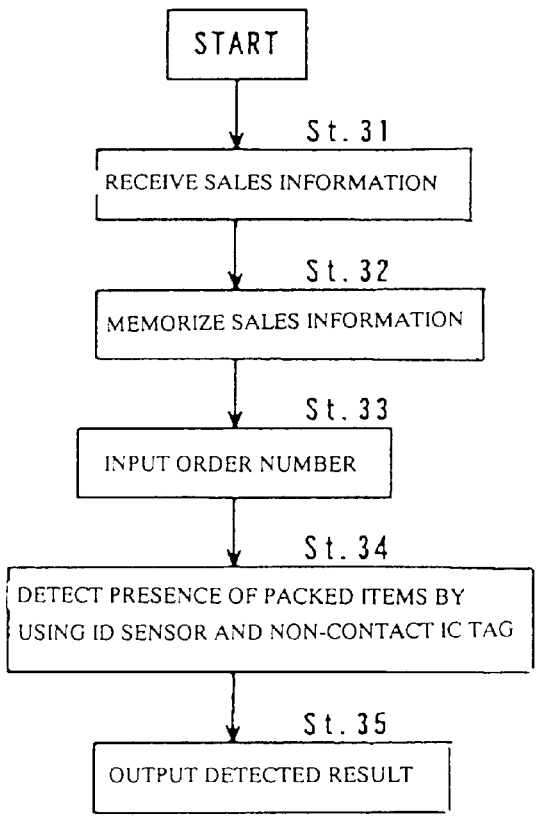
FIG. 7B is a flowchart showing an operation performed in a sensing device in accordance with the second embodiment of the present invention.

FIG. 7B is a flowchart showing an operation of the sensing device 2 performed in accordance with the second embodiment.

In step 31, the communications unit 21 receives the sales information sent from the cash register 1.

In step 32, the sales items memory 26 stores the received sales information by using the same sales items table as that shown in FIG. 2A.

When the cooking of the ordered items is finished, the shop clerk (operating the sensing device 2) receives the sales items packed in the sealed bag 41 (FIG. 8) together with the order slip. The material of the bag 41 is not transparent. Therefore, the inside of the bag 41 cannot be seen in this case.

In step 33, by operating the input section 27, the shop clerk enters the order number of the received order slit into the controller 23 of the sensing device 2. Then, the shop clerk places the received bag 41 in a scanning area of the ID sensor 34. The ID sensor 34 transmits weak radio wave. In response to this radio wave, the IC tag 46 attached on each commodity cover 45 sends an ID number representing the commodity name of a packed item. The ID sensor 34 detects the ID information transmitted from each IC tag 46. The detected ID information is sent to the controller 23.

In step 34, the controller 23 identifies commodity names and their required quantities of the packed items in the bag 41 based on the received ID information with reference to the data stored in the commodity information table (FIG. 6) stored in the commodities information memory 35. Furthermore, the controller 23 reads the data corresponding to the order number (i.e., commodity names and their required quantities) from the sales items table (FIG. 2A) stored in the sales items memory 26. Then, the controller 23 compares the identified commodity names and their required quantities with the ordered commodity names and their required quantities. When the compared data agree with each other, the controller 23 judges that the packed items inside the bag 41 are identical with the ordered items. When the compared data disagree with each other, the controller 23 judges that the packed items inside the bag 41 are not identical with the ordered items.

In step 35, the controller 23 sends the recognized result to the display unit 22. The display unit 22 displays an error message together with alarm sound or light to inform the shop clerk of occurrence of packing error. The display unit 22 also displays a non-error message when no packing error is detected.

In this manner, the second embodiment of the present invention makes it possible to check whether the packed items inside a non-transparent package agree with the customer's order by simply scanning the package (i.e., bag 41) with the IC sensor 34 (i.e., without opening the already sealed package), thereby accurately detecting any error in the packing operation of the sales items.

When the display unit 22 displays any error message, the shop clerk opens the package to confirm the parking error in detail. Each missing item is sent from the cookery. The shop clerk re-packs the ordered items into the package. Thus, it becomes possible for the shop clerk to easily and promptly prepare a correct package of the sales items.

Third Embodiment

Figure 9:
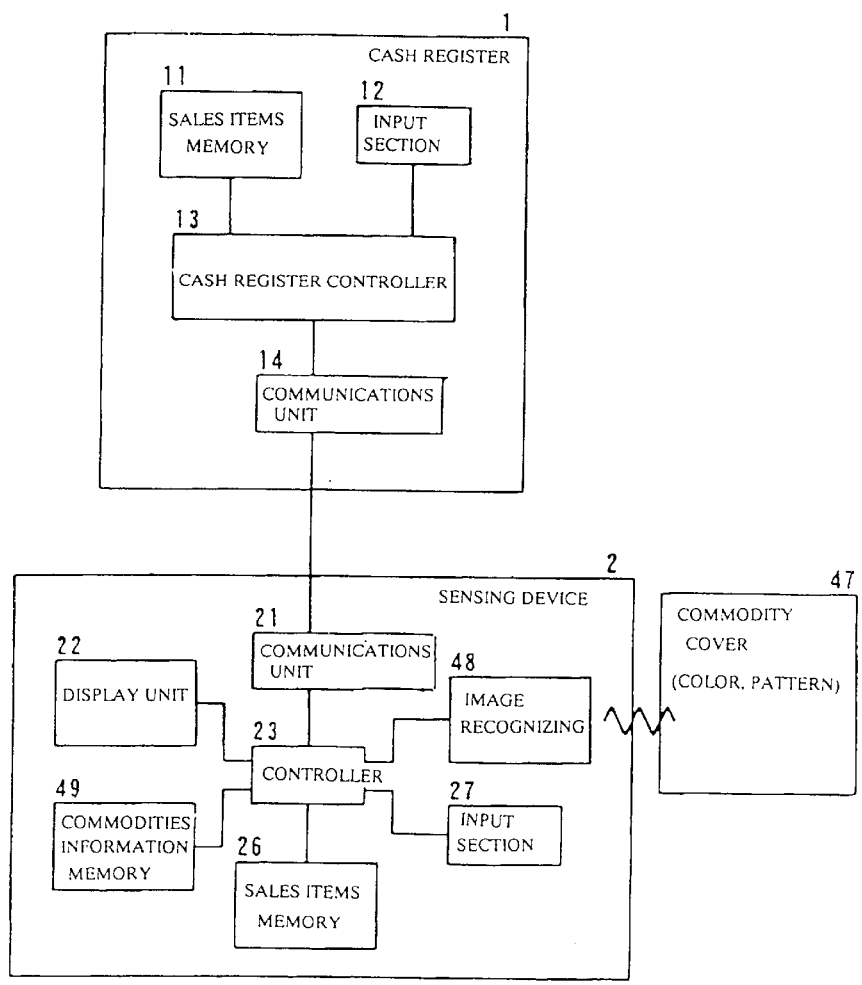
FIG. 9 is a block diagram showing the arrangement of a packing error detecting system in accordance with a third embodiment of the present invention.

FIG. 9 is a block diagram showing the arrangement of a packing error detecting system in accordance with a third embodiment of the present invention. The packing error detecting system of the third embodiment chiefly consists of a cash register 1 and a sensing device 2 which are connected to each other by cable or by wireless to perform data communications. The packing error detecting system in accordance with the third embodiment is characterized in that the packing error is detected by discriminating the appearance characteristics of a wrapping cover of each commodity.

The cash register 1 comprises an input section 12, a sales items memory 11, a communications unit 14, and a cash register controller 13 which are identical with those explained in the first embodiment.

The sensing device 2 comprises a communications unit 21 which receives the information transmitted from the cash register 1, a sales items memory 26 which stores the information of the sales items transmitted from the cash register 1, a commodities information memory 49 which stores the information relating to the appearance characteristics of each commodity, an input section 27 which allows the shop clerk to enter an order number etc., an image recognizing section 48 which detects the appearance characteristics of the wrapping cover of each sales item, a sensing device controller 23 which detects any error in a packing operation, and a display unit 22 which displays the discrimination result sent from the controller 23 to let the shop clerk know the presence of any packing error.

The commodities information memory 49 stores a commodities information table shown in FIG. 10 which describes the colors of wrapping covers of registered commodities (e.g., hamburger, cheese burger, fish burger, and fried potato).

Hereinafter, an operation of the packing error detecting system in accordance with the third embodiment will be explained.

Figure 11A:
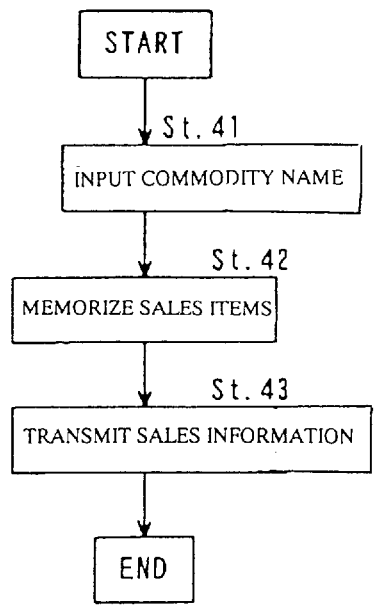
FIG. 11A is a flowchart showing an operation performed in a cash register in accordance with the third embodiment of the present invention.

FIG. 11A is a flowchart showing an operation of the cash register 1 performed in accordance with the third embodiment.

Steps 41 to 43 are identical with the steps 1 to 3 of the first embodiment. In step 41, the shop clerk (operating the cash register 1) enters sales information through the input section 12 in response to customer's order. In step 42, the sales information is sent from the controller 13 to the sales items memory 11. In step 43, the sales information is sent from the cash register 1 to the sensing device 2 via the communications unit 14.

Meanwhile, the shop clerk (operating the cash register 1) accomplishes the ordinary cashier procedure and gives the customer a receipt. An order slip issued through this order-taking procedure is sent to the cookery.

Figure 11B:
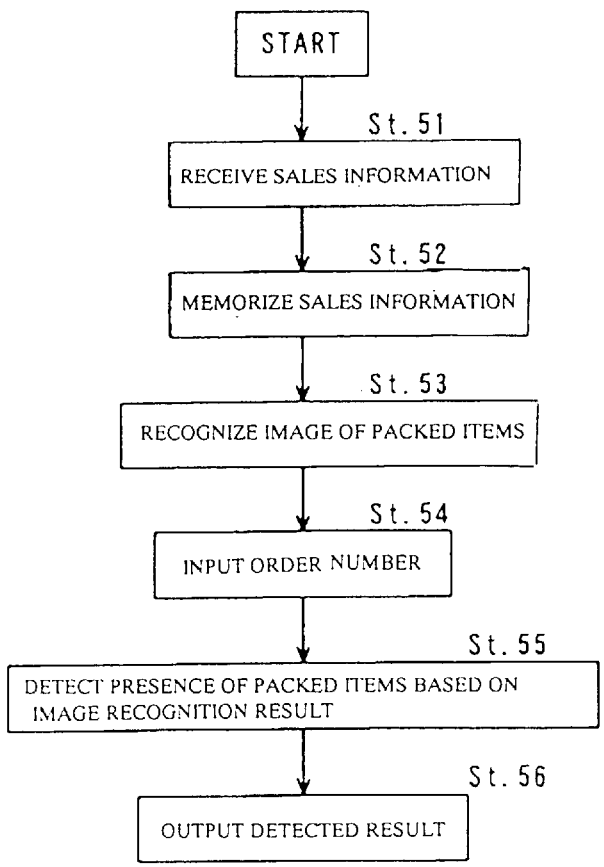
FIG. 11B is a flowchart showing an operation performed in a sensing device in accordance with the third embodiment of the present invention.

FIG. 11B is a flowchart showing an operation of the sensing device 2 performed in accordance with the third embodiment.

In step 51, the communications unit 21 receives the sales information sent from the cash register 1.

In step 52, the sales items memory 26 stores the received sales information by using the same sales items table as that shown in FIG. 2A.

In the cookery, a packing worker wraps each cooked item with a dedicated wrapping cover and places the wrapped sales item in the scanning area of the image recognizing section 48 prior to the packing operation of each wrapped sales item into the bag 41. In step 53, the image recognizing section 48 detects the color of each wrapping cover, and transmits the recognized data to the controller 23.

When the packing operation is finished, the shop clerk (operating the sensing device 2) receives the sales items packed in the sealed bag 41 together with the order slip. The material of the bag 41 is not transparent. Therefore, the inside of the bag 41 cannot be seen in this case.

In step 54, by operating the input section 27, the shop clerk enters the order number of the received order slit into the controller 23 of the sensing device 2.

In step 55, the controller 23 identifies commodity names and their required quantities of the packed items in the bag 41 based on the color information (i.e., appearance characteristics) received from the image recognizing section 48 with reference to the data stored in the commodity information table (FIG. 10) stored in the commodities information memory 49. Furthermore, the controller 23 reads the data corresponding to the order number (i.e., commodity names and their required quantities) from the sales items table (FIG. 2A) stored in the sales items memory 26. Then, the controller 23 compares the identified commodity names and their required quantities with the ordered commodity names and their required quantities. When the compared data agree with each other, the controller 23 judges that the packed items inside the bag 41 are identical with the ordered items. When the compared data disagree with each other, the controller 23 judges that the packed items inside the bag 41 are not identical with the ordered items.

In step 56, the controller 23 sends the recognized result to the display unit 22. The display unit 22 displays an error message together with alarm sound or light to inform the shop clerk of occurrence of packing error. The display unit 22 also displays a non-error message when no packing error is detected In this manner, the third embodiment of the present invention makes it possible to check whether the packed items inside a non-transparent package agree with the order's order by image recognizing the inside of the package (i.e., without opening the already sealed package), thereby accurately detecting any error in the packing operation of the sales items.

When the display unit 22 displays any error message, the shop clerk opens the package to confirm the packing error in detail. Each missing item is sent from the cookery. The shop clerk re-packs the ordered items into the package. Thus, it becomes possible for the shop clerk to easily and promptly prepare a correct package of the sales items.

Fourth Embodiment

Figures 12, 13:
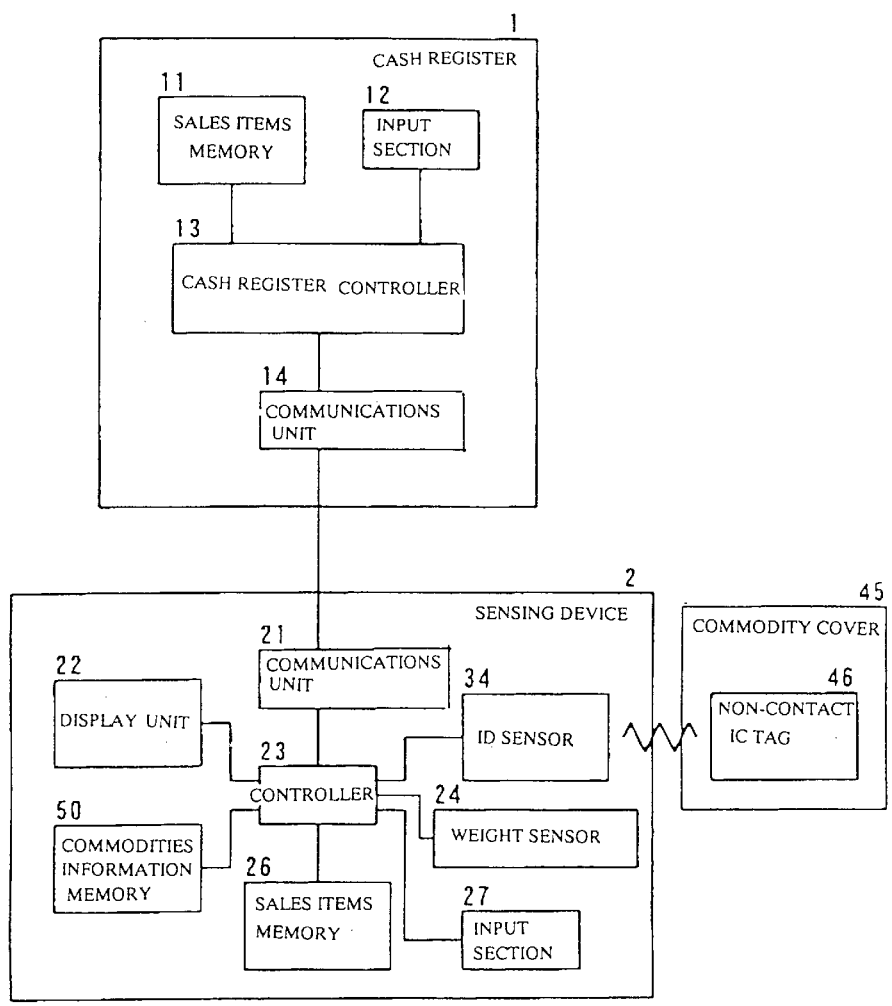
FIG. 12 is a block diagram showing the arrangement of a packing error detecting system in accordance with a fourth embodiment of the present invention.
FIG. 13 is a view showing a commodities information table used in the packing error detecting system in accordance with the fourth embodiment of the present invention.

FIG. 12 is a block diagram showing the arrangement of a packing error detecting system in accordance with a fourth embodiment of the present invention. The packing error detecting system of the fourth embodiment chiefly consists of a cash register 1 and a sensing device 2 which are connected to each other by cable or by wireless to perform data communications. The packing error detecting system in accordance with the fourth embodiment is characterized in that the packing error is double checked by measuring an overall weight of the packed items including the package and also by detecting ID information transmitted from the IC tag attached on each packed item.

The cash register 1 comprise s an input section 12, a sales items memory 11, a communications unit 14, and a cash register controller 13 which are identical with those explained in the first embodiment.

The sensing device 2 comprises a communications unit 21 which receives the information transmitted from the cash register 1, a sales items memory 26 which stores the information of the sales items transmitted from the cash register 1, a commodities information memory 50 which stores the information relating to an ID number of each commodity and the information relating to a nominal weight of each commodity as well as a nominal weight of a package, an input section 27 which allows the shop clerk to enter an order number etc., an ID sensor 34 which detects ID information transmitted from a non-contact IC tag 46 attached on a commodity cover 45 wrapping each sales item, a weight sensor 24 which measures an actual overall weight of all of the sales items including the package in the condition where the sales items are packed in the package, a sensing device controller 23 which detects any error in a packing operation, and a display unit 22 which displays the discrimination result sent from the controller 23 to let the shop clerk know the presence of any packing error.

In the cookery, each ordered item is wrapped by using the corresponding commodity cover 45 with IC tag 46, and packed in a bag 41 as shown in FIG. 8. The adjustment of IC tag 46 is performed beforehand so as to transmit the ID information (e.g., ID numbers of the commodity corresponding to the item to be wrapped by the commodity cover 45.

The commodities information memory 50 stores a commodities information table shown in FIG. 13 which describes ID numbers and nominal weight values of registered commodities (e.g., hamburger, cheese burger, fish burger, and fried potato).

Hereinafter, an operation of the packing error detecting system in accordance with the fourth embodiment will be explained.

Figure 14A:
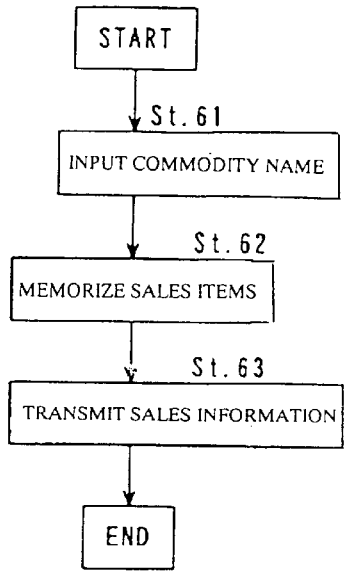
FIG. 14A is a flowchart showing an operation performed in a cash register in accordance with the fourth embodiment of the present invention.

FIG. 14A is a flowchart showing an operation of the cash register 1 performed in accordance with the fourth embodiment.

Steps 61 to 63 are identical with the steps 1 to 3 of the first embodiment. In step 61, the shop clerk (operating the cash register 1) enters sales information through the input section 12 in response to customer's order. In step 62, the sales information is sent from the controller 13 to the sales items memory 11. In step 63, the sales information is sent from the cash register 1 to the sensing device 2 via the communications unit 14.

Meanwhile, the shop clerk (operating the cash register 1) accomplishes the ordinary cashier procedure and gives the customer a receipt. An order slip issued through this order-taking procedure is sent to the cookery.

Figure 14B:
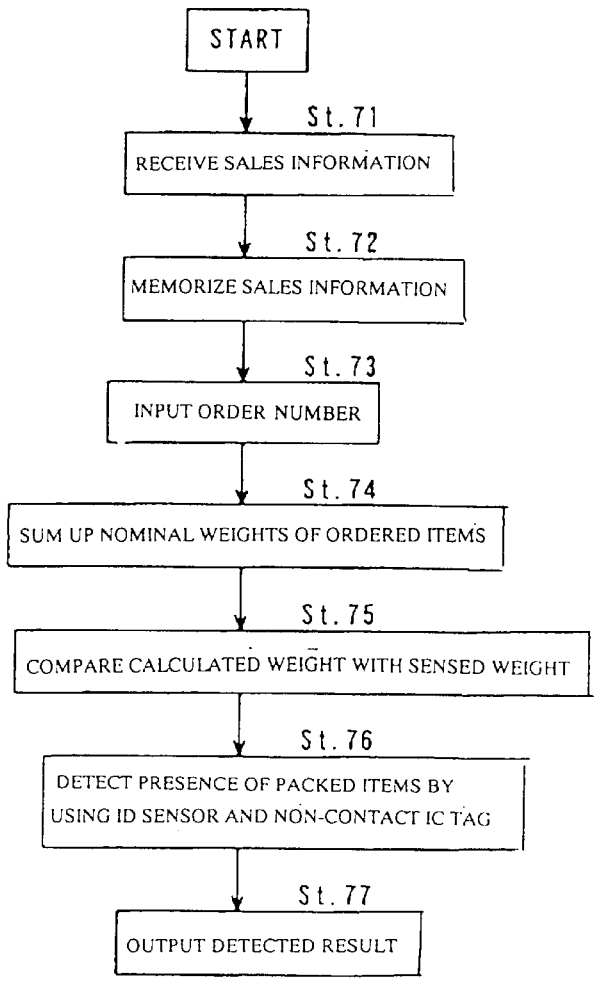
FIG. 14B is a flowchart showing an operation performed in a sensing device in accordance with the fourth embodiment of the present invention.

FIG. 14B is a flowchart showing an operation of the sensing device 2 performed in accordance with the fourth embodiment.

In step 71, the communications unit 21 receives the sales information sent from the cash register 1.

In step 72, the sales items memory 26 stores the received sales information by using the same sales items table as that shown in FIG. 2A.

When the cooking of the ordered items is finished, the shop clerk (operating the sensing device 2) receives the sales items packed in the sealed bag 41 (FIG. 8) together with the order slip. The material of the bag 41 is not transparent. Therefore, the inside of the bag 41 cannot be seen in this case. The received bag is placed on the weight sensor 24 to measure the actual overall weight of all of the cooked items (i.e., sales items) including the package.

In step 73, by operating the input section 27, the shop clerk enters the order number of the received order slit into the controller 23 of the sensing device 2.

In step 74, the controller 23 reads the data corresponding to the order number (i.e., commodity names and their required quantities) from the sales items table (FIG. 2A) stored in the sales items memory 26. Meanwhile, the controller 23 reads the nominal weight data of the designated commodities and the package (i.e., bag 41) from the commodities information table (FIG. 13) stored in the commodities information memory 50. Then, the controller 23 calculates a nominal weight sum of all of the sales items and the package based on the readout data (i.e., the nominal weight values of the sales items and the required quantities in addition to the nominal weight of the package).

In step 75, the controller 23 compares the nominal weight sum obtained in the step 74 with the actual overall weight measured by the weight sensor 24. When the difference between the nominal weight sum and the actual overall weight is within a predetermined threshold, the controller 23 judges that the packed items inside the bag 41 are identical with the ordered items. When the difference exceeds the predetermined threshold, the controller 23 judges that the packed items inside the bag 41 are not identical with the ordered items.

Then, the shop clerk places the received bag 41 in a scanning area of the ID sensor 34. The ID sensor 34 transmits weak radio wave. In response to this radio wave, the IC tag 46 attached on each commodity cover 45 sends an ID number representing the commodity name of a packed item. The ID sensor 34 detects the ID information transmitted from each IC tag 46. The detected ID information is sent to the controller 23.

In step 76, the controller 23 identifies commodity names and their required quantities of the packed items in the bag 41 based on the received ID information with reference to the data stored in the commodity information table (FIG. 13) stored in the commodities information memory 50. Furthermore, the controller 23 reads the data corresponding to the order number (i.e., commodity names and their required quantities) from the sales items table (FIG. 2A) stored in the sales items memory 26. Then, the controller 23 compares the identified commodity names and their required quantities with the ordered commodity names and their required quantities. When the compared data agree with each other, the controller 23 judges that the packed items inside the bag 41 are identical with the ordered items. When the compared data disagree with each other, the controller 23 judges that the packed items inside the bag 41 are not identical with the ordered items.

Then, the controller 23 concludes that any packing error is present when any disagreement is detected in at least one of the above steps 75 and 76.

In step 77, the controller 23 sends the recognized result to the display unit 22. The display unit 22 displays an error message together with alarm sound or light to inform the shop clerk of occurrence of packing error. The display unit 22 also displays a non-error message when no packing error is detected.

In this manner, the fourth embodiment of the present invention makes it possible to check whether the packed items inside a non-transparent package agree with the customer's order based on the comparison between the actual overall weight and the nominal weight sum as well as based on the scanning result of the IC sensor 34 (i.e., without opening the already sealed package), thereby accurately detecting any error in the packing operation of the sales items.

When the display unit 22 displays any error message, the shop clerk opens the package to confirm the packing error in detail. Each missing item is sent from the cookery. The shop clerk re-packs the ordered items into the package. Thus, it becomes possible for the shop clerk to easily and promptly prepare a correct package of the sales items.

Fifth Embodiment

Figures 15, 16:
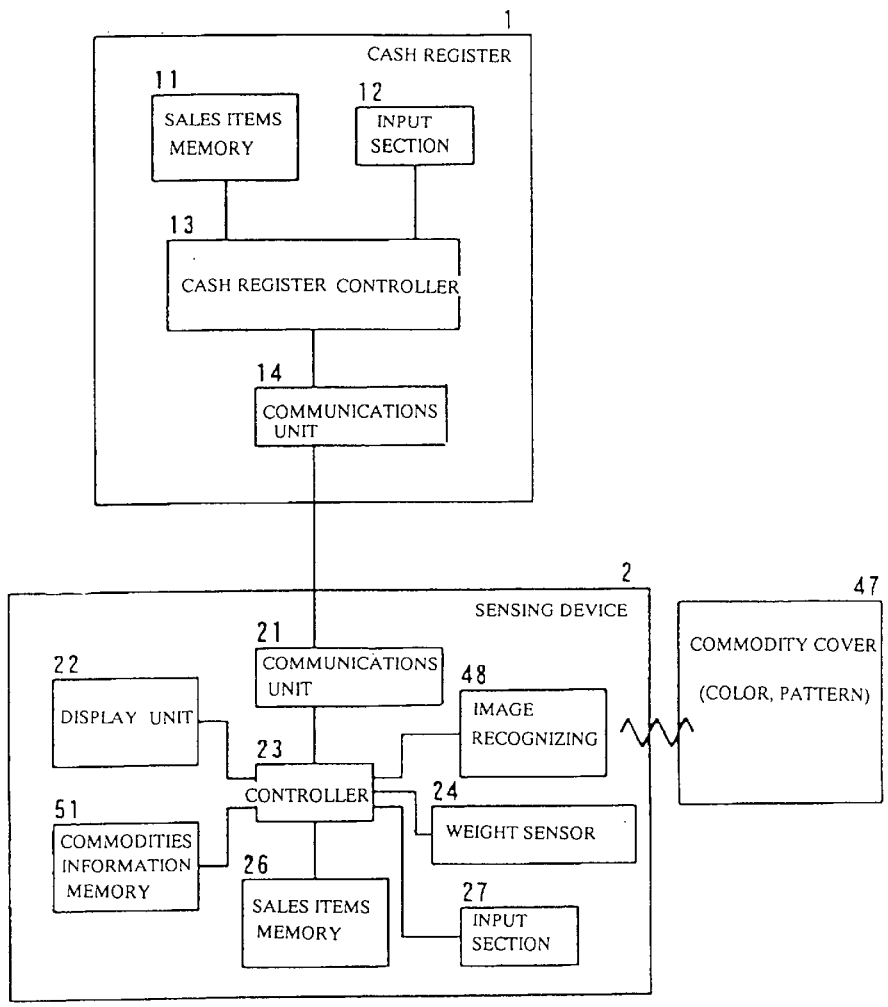
FIG. 15 is a block diagram showing the arrangement of a packing error detecting system in accordance with a fifth embodiment of the present invention.
FIG. 16 is a view showing a commodities information table used in the packing error detecting system in accordance with the fifth embodiment of the present invention.

FIG. 15 is a block diagram showing the arrangement of a packing error detecting system in accordance with a fifth embodiment of the present invention. The packing error detecting system of the fifth embodiment chiefly consists of a cash register 1 and a sensing device 2 which are connected to each other by cable or by wireless to perform data communications. The packing error detecting system in accordance with the fifth embodiment is characterized in that the packing error is double checked by measuring an overall weight of the packed items including the package and also by analyzing the image of each packed item.

The cash register 1 comprises an input section 12, a sales items memory 11, a communications unit 14, and a cash register controller 13 which are identical with those explained in the first embodiment.

The sensing device 2 comprises a communications unit 21 which receives the information transmitted from the cash register 1, a sales items memory 26 which stores the information of the sales items transmitted from the cash register 1, a commodities information memory 51 which stores the information relating to the appearance characteristics of each commodity, an input section 27 which allows the shop clerk to enter an order number etc., an image recognizing section 48 which detects the appearance characteristics of the wrapping cover of each sales item, a weight sensor 24 which measures an actual overall weight of all of the sales items including the package in the condition where the sales items are packed in the package, a sensing device controller 23 which detects any error in a packing operation, and a display unit 22 which displays the discrimination result sent from the controller 23 to let the shop clerk know the presence of any packing error.

The commodities information memory 51 stores a commodities information table shown in FIG. 16 which describes wrapping colors and nominal weight values of registered commodities (e.g., hamburger, cheese burger, fish burger, and fried potato).

Hereinafter, an operation of the packing error detecting system in accordance with the fifth embodiment will be explained.

FIG. 17A is a flowchart showing an operation of the cash register 1 performed in accordance with the fifth embodiment.

Steps 81 to 83 are identical with the steps 1 to 3 of the first embodiment. In step 81, the shop clerk (operating the cash register 1) enters sales information through the input section 12 in response to customer's order. In step 82, the sales information is sent from the controller 13 to the sales items memory 11. In step 83, the sales information is sent from the cash register 1 to the sensing device 2 via the communications unit 14.

Meanwhile, the shop clerk (operating the cash register 1) accomplishes the ordinary cashier procedure and gives the customer a receipt. An order slip issued through this order-taking procedure is sent to the cookery.

FIG. 17B is a flowchart showing an operation of the sensing device 2 performed in accordance with the fifth embodiment.

In step 91, the communications unit 21 receives the sales information sent from the cash register 1.

In step 92, the sales items memory 26 stores the received sales information by using the same sales items table as that shown in FIG. 2A.

In the cookery, a packing worker wraps each cooked item with a dedicated wrapping cover and places the wrapped sales item in the scanning area of the image recognizing section 48 prior to the packing operation of each wrapped sales item into the bag 41. In step 93, the image recognizing section 48 detects the color of each wrapping cover, and transmits the recognized data to the controller 23.

When the packing operation is finished, the shop clerk (operating the sensing device 2) receives the sales items packed in the sealed bag 41 together with the order slip. The material of the bag 41 is not transparent. Therefore, the inside of the bag 41 cannot be seen in this case. The received bag is placed on the weight sensor 24 to measure the actual overall weight of all of the cooked items (i.e., sales items) including the package.

In step 94, by operating the input section 27, the shop clerk enters the order number of the received order slit into the controller 23 of the sensing device 2.

In step 95, the controller 23 reads the data corresponding to the order number (i.e., commodity names and their required quantities) from the sales items table (FIG. 2A) stored in the sales items memory 26. Meanwhile, the controller 23 reads the nominal weight data of the designated commodities and the package (i.e., bag 41) from the commodities information table (FIG. 16) stored in the commodities information memory 51. Then, the controller 23 calculates a nominal weight sum of all of the sales items and the package based on the readout data (i.e., the nominal weight values of the sales items and the required quantities in addition to the nominal weight of the package).

In step 96, the controller 23 compares the nominal weight sum obtained in the step 95 with the actual overall weight measured by the weight sensor 24. When the difference between the nominal weight sum and the actual overall weight is within a predetermined threshold, the controller 23 judges that the packed items inside the bag 41 are identical with the ordered items. When the difference exceeds the predetermined threshold, the controller 23 judges that the packed items inside the bag 41 are not identical with the ordered items.

In step 97, the controller 23 identifies commodity names and their required quantities of the packed items in the bag 41 based on the color information (i.e., appearance characteristics) received from the image recognizing section 48 with reference to the data stored in the commodity information table (FIG. 16) stored in the commodities information memory 51. Furthermore, the controller 23 reads the data corresponding to the order number (i.e., commodity names and their required quantities) from the sales items table (FIG. 2A) stored in the sales items memory 26. Then, the controller 23 compares the identified commodity names and their required quantities with the ordered commodity names and their required quantities. When the compared data agree with each other, the controller 23 judges that the packed items inside the bag 41 are identical with the ordered items. When the compared data disagree with each other, the controller 23 judges that the packed items inside the bag 41 are not identical with the ordered items.

Then, the controller 23 concludes that any packing error is present when any disagreement is detected in at least one of the above steps 96 and 97.

In step 98, the controller 23 sends the recognized result to the display unit 22. The display unit 22 displays an error message together with alarm sound or light to inform the shop clerk of occurrence of packing error. The display unit 22 also displays a non-error message when no packing error is detected.

In this manner, the fifth embodiment of the present invention makes it possible to check whether the packed items inside a non-transparent package agree with the customer's order based on the comparison between the actual overall weight and the nominal weight sum as well as based on the image recognition of the packed items (i.e., without opening the already sealed package), thereby accurately detecting any error in the packing operation of the sales items.

When the display unit 22 displays any error message, the shop clerk opens the package to confirm the packing error in detail. Each missing item is sent from the cookery. The shop clerk re-packs the ordered items into the package. Thus, it becomes possible for the shop clerk to easily and promptly prepare a correct package of the sales items.

In the above-described fourth and fifth embodiments, the order of the double checking operation (i.e., the steps 75 and 76 in the fourth embodiment, or in the steps 96 and 97 in the fifth embodiment) is flexibly changed.

It is also possible to cause the display unit 22 to display an error message when any disagreement is detected in the first step of the double checking operation without waiting the judgement in the second step of the double checking.

Furthermore, it is possible for a same person to serve as the shop clerk operating both of the cash register 1 and the sensing device 2 and also serve as the packing worker of the present invention.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A packing error detecting system employed to check whether all of sales items are correctly packed in a package in accordance with a customer's order without opening the already sealed package, said packing error detecting system comprising:

sales items memory means for storing each commodity name of sales items in response to customer's placing of an order through a cash register prior to packing of said sales items;

commodity information memory means for storing a nominal weight of each commodity as well as a nominal weight of a package beforehand;

sensing means activated after completing the packing of said sales items according to the customer's order for measuring an actual overall weight of all of said ordered sales items including said package in a condition where said ordered sales items are packed in the already sealed package; and control means for calculating a nominal weight sum of said sales items and said package based on the information stored in said sales items memory means and the information stored in said commodity information memory means, and for detecting any error in a packing operation of said sales items packed into said package based on a comparison between said nominal weight sum and said actual overall weight measured by said sensing means.

2. A packing error detecting system employed to check whether all of sales items are correctly packed in a package in accordance with a customer's order without opening the already sealed package, said packing error detecting system comprising:

sales items memory means for storing each commodity name of sales items in response to customer's placing of an order through a cash register prior to packing of said sales items;

commodity information memory means for storing ID information of each commodity beforehand;

sensing means activated after completing the packing of said sales items according to the customer's order for detecting ID information transmitted from an IC tag attached on a wrapping cover of each sales item in a condition where said ordered sales items are packed in the already sealed package; and control means for detecting any error in a packing operation of said sales items packed into said package based on a comparison between said ID information obtained by said sensing means and the information stored in said sales items memory with reference to the information stored in said commodity information memory means.

3. A packing error detecting system employed to check whether all of sales items are correctly packed in a package in accordance with a customer's order without opening the already sealed package, said packing error detecting system comprising:

sales items memory means for storing each commodity name of sales items in response to customer's placing of an order through a cash register prior to packing of said sales items;

commodity information memory means for storing printed indicia (pattern, color) of a wrapping cover of each commodity beforehand;

image recognizing means activated after completing the packing of said sales items according to the customer's order for detecting the printed indicia of the wrapping cover of each sales item in a condition where said ordered sales items are packed in the already sealed package; and control means for detecting any error in a packing operation of said sales items packed into said package based on a comparison between the recognized result obtained by said image recognizing means and the information stored in said sales items memory with reference to the information stored in said commodity information memory means.

4. A packing error detecting system employed to check whether all of sales items are correctly packed in a package in accordance with a customer's order without opening the already sealed package, said packing error detecting system comprising:

sales items memory means for storing each commodity name of sales items in response to customer's placing of an order through a cash register prior to packing of said sales items;

commodity information memory means for storing a nominal weight of each commodity as well as a nominal weight of a package in addition to ID information of each commodity beforehand;

first sensing means activated after completing the packing of said sales items according to the customer's order for measuring an actual overall weight of all of said ordered sales items including said package in a condition where said ordered sales items are packed in the already sealed package;

second sensing means activated after completing the packing of said sales items according to the customer's order for detecting ID information transmitted from an IC tag attached on a wrapping cover of each sales item in a condition where said ordered sales items are packed in the already sealed package; and control means for calculating a nominal weight sum of said sales items and said package based on the information stored in said sales items memory means and the information stored in said commodity information memory means, and for detecting any error in a packing operation of said sales items packed into said package based on a comparison between said nominal weight sum and said actual overall weight measured by said first sensing means as well as based on a comparison between said ID information obtained by said second sensing means and the information stored in said sales items memory with reference to the information stored in said commodity information memory means.

5. A packing error detecting system employed to check whether all of sales items are correctly packed in a package in accordance with a customer's order without opening the already sealed package, said packing error detecting system comprising:

sales items memory means for storing each commodity name of sales items in response to customer's placing of an order through a cash register prior to packing of said sales items;

commodity information memory means for storing a nominal weight of each commodity as well as a nominal weight of a package in addition to printed indicia (pattern. color) of a wrapping cover of each commodity beforehand;

sensing means activated after completing the packing of said sales items according to the customer's order for measuring an actual overall weight of all of said ordered sales items including said package in a condition where said ordered sales items are packed in the already sealed package;

image recognizing means activated after completing the packing of said sales items according to the customer's order for detecting the printed indicia of the wrapping cover of each sales item in a condition where said ordered sales items are packed in the already sealed package; and control means for calculating a nominal weight sum of said sales items and said package based on the information stored in said sales items memory means and the information stored in said commodity information memory means, and for detecting any error in a packing operation of said sales items packed into said package based on a comparison between said nominal weight sum and said actual overall weight measured by said sensing means as well as based on a comparison between the recognized result obtained by said image recognizing means and the information stored in said sales items memory with reference to the information stored in said commodity information memory means.

* * * * *